Patented Feb. 19, 1952

2,586,519

UNITED STATES PATENT OFFICE 2,586,519

LIME-FREE CALCIUM ARSENATE AND GAMMA BENZENE HEXACHLORIDE INSECTICIDE AND METHOD

Thomas W. Collins, Jr., Iselin, N. J., assignor to Allied Chemical & Dye Corporation, New York, N. Y., a corporation of New York No Drawing. Application April 14, 1948, Serial No. 21,087

6 Claims. (Cl. 167—15)

This invention relates to a new insecticidal composition and method for combating insect pests and more particularly to a new composition and method for simultaneously combating two major cotton pests, namely the boll weevil, *Anthonomus grandis* Boh. and the cotton aphid, *Aphis gossypii* Glov.

One of the standard materials commonly used for combating the cotton boll weevil is calcium arsenate, which, as commercially prepared, is a mixture of various calcium arsenates with an appreciable amount of free lime, which mixture usually exhibits a hydroxyl ion concentration equivalent to a pH of about 11.4. The use of this material, while effective in combating the boll weevil, unfortunately stimulates and increases the aphid population at the same time. Attempts have been made in the past to control the aphid pest by the addition of other agents to the calcium arsenate, including dichlorodiphenyltrichloroethane, nicotine, etc. These expedients were only partially successful, and moreover, nicotine (in the form of nicotine sulfate) the best of the additive agents so far used, is both expensive and scarce and is a relatively volatile compound which as commercially used, is not only unstable in use and upon storage, but is extremely toxic and hazardous to the health of workers who prepare and apply the compositions.

It has recently been found that the gamma isomer of benzene hexachloride (hexachlorocyclohexane) exerts outstandingly lethal effects against the cotton aphid, even in relatively low concentrations. However, attempts to control both boll weevil and aphid pests simultaneously by incorporating benzene hexachloride with calcium arsenate were unsuccessful due to the incompatibility of benzene hexachloride with the calcium arsenates of commerce, resulting, on contact of the two, not only in rapid decomposition of the benzene hexachloride, but also in a rapid increase in the water-soluble arsenic content in the calcium arsenate with its attendant injury to plant foliage.

I have now found, that a stable insecticidal composition, effective in simultaneously controlling the boll weevil and cotton aphid, as well as certain other cotton pests, may be prepared according to my invention wherein suitable proportions of gamma benzene hexachloride are admixed with a specially prepared calcium arsenate composition of controlled hydroxyl ion concentration, negligible free lime content and high compatibility with hexachlorocyclohexane.

The new composition of my invention comprises a mixture of a major proportion of specially prepared low hydroxyl ion concentration calcium arsenate with a minor proportion of the gamma benzene hexachloride isomer. It has the advantage of containing in a single dust composition, two compounds which heretofore could not be combined because of almost immediate decomposition of the benzene hexachloride. This decomposition resulted not only in loss of effectiveness of the benzene hexachloride, but in so increasing the water-soluble arsenic content of the composition by the action of the free hydrochloric acid evolved, that not only was the beneficial effect of the benzene hexachloride lost, but the value of the calcium arsenate was destroyed due to the injurious effect on plant foliage of the water-soluble arsenic.

My new composition not only has an unusually low initial water-soluble arsenic content, but is stable on storage to such extent that not only is the effectiveness of the benzene hexachloride preserved, but only a very slight increase, if any, in water-soluble arsenic takes place on storage even over periods of several months. As brought out in Tables I and II-A below, an increase in water-soluble arsenic of less than .2% takes place in mixtures of effective quantities of benzene hexachloride, with the special calcium arsenate when stored for periods of two months, even under the drastic conditions of summer storage in paper bags, used in the second series of tests.

The low hydroxyl ion concentration calcium arsenate used may be prepared by simultaneously adding to a reaction vessel, quantities of dilute arsenic acid and lime slurry, gradually with agitation, in such proportions that the pH is maintained between about 9.3 and 10.5 during the mixing and preferably as near 9.5 to 9.7 as possible. The temperature at the start of mixing is raised to about 160° F. and is gradually increased to boiling at the end of the raw material addition, a period, for example, of about one hour for a 2 ton batch. The arsenic acid used is preferably diluted with water and may vary in concentration between about 40% and 50% arsenic acid. The lime slurry may be made up in the usual way, preferably by adding just sufficient water to the lime to form a flowable slurry, usually using about 30% lime to about 70% of water. After addition of all the materials, the batch is boiled for a short period, for example a half hour, additional materials being added as required to maintain the pH value within the specified range. This material is then dried and ground to a dust in the usual manner. The resulting material is substantially devoid of free lime, containing not more than about 1% free lime, and has a pH when slurried in water to form a ½% dispersion, of between 9.3 and 10.5 preferably between 9.5 and 9.7 as compared to pH values of about 11.4 in commercial calcium arsenate preparations. Its water-soluble arsenic content is not more than about .5% as $As_2O_5$, an amount far below the quantities contained in standard calcium arsenate of about 2 to 5%. The compatibility of the special calcium arsenate with benzene hexachloride is such that the water-soluble arsenic content of mixtures therewith in the range of proportions indicated does not exceed about 1% as $As_2O_5$ as determined by the so-called "Geneva" method referred to below.

In preparing the special low hydroxyl ion concentration calcium arsenate, it is important that the mixture be alkaline at all times during the mixing, and preferably within the pH range 9.3 to 10.5, and, that the batch when completed to be balanced to approximately pH 9.5. The desired alkalinity control may be maintained in any desired manner during preparation of the calcium arsenate, for example, by electrometric means using the conductivity of the mixture to control the addition of the raw materials, as illustrated in the example below.

In starting the mixing operation it is desirable first to add water containing a small proportion of lime to the reaction vessel, before starting the flow of arsenic acid.

The following specific example will further illustrate the preparation of the low hydroxyl ion concentration calcium arsenate used in my invention.

Example

Ten pounds of special calcium arsenate were prepared in a lead lined container heated by a steam coil. Two electrodes of No. 12 copper wire ¾" long, separated by about 12 inches, were used in conjunction with a milliameter and transformer using alternating current and voltage of 12 volts. The electrical equipment was used to control the addition of raw materials after first balancing an initial small charge to a pH of 10.5. Vigorous agitation was provided.

The run was started by placing about 3 gallons (11.3 liters) of water in the reaction vessel, and adding thereto a few cubic centimeters of the lime slurry. The pH of the lime-water charge was then balanced to 10.5 as measured by a Beckman pH meter by the addition of dilute arsenic acid. Then simultaneous addition of lime slurry and dilute arsenic acid was commenced. A total of 3800 grams of arsenic acid of 70% $H_3AsO_4$ concentration diluted with an equal volume of tap water was used, and 2820 grams of lime slurried with cold water as described above. The milliampere reading at the start was 40 after balancing the pH to 10.5 and the reading was maintained (on the alkaline side), between about 25 and 40, corresponding to a pH between 9.3 and 10.5, while adding the acid and lime slurry, by suitable variations in the proportions of lime or acid added.

About two hours were required to add the acid and lime. At all times the material had a pH value between 9.3 and 10.5 and the temperature was maintained at 180–210° F. After addition of all raw materials the batch was boiled for one-half hour, after which time the pH was 9.45 and the milliampere reading was 24. The pH was adjusted to 9.5. The material was drawn from the mixer, placed in a stainless steel pan and dried on a hot plate.

The dried material had the following analysis:

| | |
|---|---|
| $As_2O_5$ per cent | 46.6 |
| pH | 9.4 |
| Cu. in./lb. | 102. |
| Water-soluble $As_2O_5$ (Geneva) per cent | .32 |

The special type of calcium arsenate above described has the advantage over the standard type of calcium arsenate of having a high compatibility with benzene hexachloride such that mixtures thereof in the effective proportions indicated are not appreciably decomposed over relatively prolonged storage periods. At the same time the new calcium arsenate exhibits an extremely low water-soluble arsenic content which is not appreciably increased on storage either alone or in contact with benzene hexachloride or other additives. Its arsenic content is relatively high being above 45% and usually averaging between about 45 and 47% as $As_2O_5$, or higher.

The pH range between 9.3 and 10.5 is important, since pH values below about 9.3 result in the formation of higher percentages of water-soluble arsenic with resulting injury to plant foliage, while pH values above about 10.5 give rise to undue decomposition of the benzene hexachloride.

The benezene hexachloride used in my new composition may be prepared by any desired known methods, for example, by the reaction of benzene with chlorine in the presence of light or other catalysts. A benzene hexachloride relatively high in the gamma isomer is preferred, since this isomer is known to possess outstanding insecticidal properties. In general a mixture of benzene hexachloride isomers containing at least about 7% of the gamma isomer is preferred.

In preparing the composition of my invention, mixtures of low hydroxyl ion concentration calcium arsenate and benzene hexachloride may be made in any desired proportions following any of the well known procedures for preparing insecticidal dusts. For example, the final calcium arsenate-benzene hexachloride mixture should contain at least about 50% of calcium arsenate, preferably between about 60 and 90%; and of the gamma benzene hexachloride isomer between about .5 and 5%, preferably between about 1 and 3%, for substantially complete control of the two cotton pests. Lesser or greater quantities may be used and are proportionately less or more effective. Using, for example, a low hydroxyl ion concentration calcium arsenate of the type described in the foregoing example, and a benzene hexachloride having a 10% gamma isomer content, a particularly satisfactory mixture is obtained by combining from 60 to 80% of the special lime-free calcium arsenate 20% of the benzene hexachloride, any remainder being made up of inert filler or other additives. Proportionately greater or lesser quantities of benzene hexachloride are required when the benzene hexachloride has a lesser or greater gamma content.

Other materials may be added to the mixture, if desired, including other insecticides and inert neutral fillers and dusts such as clays, and the like. My new composition is compatible with most standard insecticides and insecticidal carrier dusts including dichlorodiphenyl trichloroethane, sulfur, tribasic copper sulfate, clays, and the like, including the hydrous aluminum silicate type clays commonly used in preparing insecticidal dusts.

The components of the mixture are preferably reduced to dust form before mixing, for example, to a fineness such that 85 to 90% will pass through a 325 mesh screen. In the case of the benzene hexachloride, the particle size should preferably be not less than about 20 microns, preferably between about 20 and 40 microns. Greater fineness than that indicated is undesirable, as the compound is somewhat volatile, and at the greater fineness, considerable loss of the effective agent occurs through evaporation during the dusting application.

The components may be mixed in any manner suitable for preparing uniform dust mixtures. I have found a satisfactory mixture to result by feeding the components simultaneously or alternately through a coarse sifter box into a bladed horizontal mixer, and mixing until a uniform mixture is obtained. The resulting composition is a dust of the type suitable for insecticidal application by the standard known types of dusting equipment, and may be applied to plants in greenhouses, fields, etc., by any suitable known method of application.

My new composition provides a single composition for effectively combating two of the most destructive cotton pests, namely, the boll weevil, and the cotton aphid; it exerts as well, a marked restraining effect on certain other cotton pests such as the cotton leaf worm.

The following tests recorded in Tables I to IX below, indicate the effectiveness of my new composition. In carrying out the tests, the benzene hexachloride used (abbreviated as "BHC" in the tables) was a mixture of isomers, variously containing 7%, 10% and 11% of the gamma isomer. The benzene hexachloride mixtures used in the compositions of Tables I to VII inclusive were made up in a 50-50 mixture with a hydrous aluminum silicate type dusting clay. A sufficient quantity of special calcium arsenate and of the above composition was used to produce the desired proportions of calcium arsenate and of the gamma isomer in the insecticidal composition, indicated as such in the tables.

The tests described in Tables I and II illustrate the comparative stability of the compounds of my invention containing benzene hexachloride and low hydroxyl ion concentration calcium arsenate, as compared to similar compositions containing standard calcium arsenates. The compositions of the tests illustrated were made up according to the standard mixing procedure described above and in carrying out the storage test recorded in Table I, two pounds of each were placed in paper bags and stored at room temperatures for two months. The samples were first analyzed immediately after preparation, then after one month's storage and after two months' storage for percentage decomposition of the benzene hexachloride, as measured by two different tests (a) the water-soluble chlorine content, and (b) the water-soluble arsenic content of the mixture at the same intervals. In making these tests, the soluble chlorine was determined according to the standard method described in Scott's Standard Methods of Chemical Analysis, Fifth Edition, vol. I, page 272. The water-soluble arsenic content was determined according to the so-called "Geneva" test described on page 8 of Technical Bulletin No. 234 (October 1935) of the New York State Agricultural Experiment Station at Geneva, New York, entitled "A Chemical Method for Determining the Safeness of Foliage of Commercial Calcium Arsenates," abbreviated "Geneva Method." This method involves the initial neutralization with carbon dioxide of the free lime in a water suspension of the calcium arsenate, followed by further dilution, 24 hour standing, filtration and determination of arsenic in the filtrate by the bromate method for determining arsenic in foods.

Results of these tests are given in Table I below.

TABLE I

*Stability of compositions containing benzene hexachloride with special calcium arsenate and with standard commercial type calcium arsenate*

| Composition | Percent Total BHC | Percent Gamma | Percent Water-Soluble Chlorine | | Percent Water-Soluble Arsenic at | | | Percent Decomposition BHC | |
|---|---|---|---|---|---|---|---|---|---|
| | | | Initial | One Month | Initial | One Month | Two Months | One Month | Two Months |
| 10% BHC mix[1] <br> 90% Std. Ca. Ars. | 5 | 0.5 | 1.03 | 1.21 | 0.18 | 0.6 | 1.24 | 66.2 | 65 |
| 20% BHC mix[1] <br> 80% Std. Ca. Ars. | 10 | 1.0 | 1.42 | 1.77 | .2 | 0.6 | 1.82 | 48.4 | 36 |
| 10% BHC mix[1] <br> 90% Sp. Ca. Ars. | 5 | 0.5 | ---------- | 0.25 | 0.35 | 0.48 | .46 | 13.6 | 26.4 |
| 20% BHC mix[1] <br> 80% Sp. Ca. Ars. | 10 | 1.0 | ---------- | 0.36 | .45 | .42 | .63 | 9.7 | 18.08 |
| 10% BHC mix[1] <br> 90% Std. Ca. Ars. | 5 | 0.5 | ---------- | 1.18 | 0.98 | 1.21 | 3.45 | 46.6 | 61.4 |
| 20% BHC mix[1] <br> 80% Std. Ca. Ars. | 10 | 1.0 | ---------- | 1.35 | 0.08 | 2.35 | 3.79 | 31 | 30.6 |

[1] 50-50 BHC—Clay Mixture.

Another series of compositions was prepared by mixing 71.5% of special and standard calcium arsenates respectively with 28.5% of benzene hexachloride (containing 7.1% gamma isomer) according to the procedure described above. Portions of these compositions were placed in 50 lb. so-called waterproof paper bags and in 100 lb. steel drums respectively, and stored. Tests of water-soluble arsenic and of soluble chlorine were made at the start immediately after preparation of the mixture and after 30 days and 60 days storage at outdoor summer temperatures during July and August. The special mixture contained about 33% $As_2O_5$ and approximately 1.9% gamma benzene hexachloride. The standard calcium arsenate mixture contained 29% $As_2O_5$ and 1.9% gamma benzene hexachloride.

The water-soluble arsenic tests were run according to both the "Geneva Method" described above and according to the U. S. Government Official Method of the Association of Official Agricultural Chemists, described on page 47 of the Official and Tentative Methods of Analysis of the Association of Official Agricultural Chemists, Fifth Edition (1940), and abbreviated "Government Method." The "Government" test, briefly stated, involves digesting calcium arsenate in water for 24 hours, filtering and determining arsenic in the filtrate by titration with iodine.

The results of these tests are given in Tables II-A and II-B below.

TABLE II-A

*Stability of compositions containing 28.5% benzene hexachloride (containing 7.1% gamma) and 71.5% special calcium arsenate*

| Test | Start | After 30 days— | | After 60 days— | |
|---|---|---|---|---|---|
| | | Bag | Drum | Bag | Drum |
| Water Soluble Chlorine, Per Cent | .08 | .18 | .17 | .17 | .15 |
| Water-Soluble Arsenic, Per Cent (Geneva Method) | .52 | .69 | .63 | .69 | .69 |
| Water-Soluble Arsenic, Per Cent (Government Method) | .52 | .69 | .63 | .69 | .69 |
| pH or 0.5% Solution | 9.6 | 9.7 | 9.7 | 9.76 | 9.7 |
| Per Cent BHC Decomposed | 2.5 | 4.98 | 4.98 | 4.98 | 4.98 |

TABLE II-B

*Stability tests on compositions containing 28.5% benzene hexachloride (containing 7.1% gamma) and 71.5% standard calcium arsenate*

| Test | Start | After 30 days— | |
|---|---|---|---|
| | | Bag | Drum |
| Water Soluble Chlorine, Per Cent | 1.3 | 1.3 | 1.3 |
| Water Soluble Arsenic, Per cent (Geneva Method) | 3.0 | 2.99 | 3.05 |
| Water Soluble Arsenic, Per Cent (Government Method) | .07 | .17 | .12 |
| pH of 0.5% Solution | 11.8 | 12.3 | 12.3 |
| Per Cent BHC Decomposed | 19.0 | 19.0 | 19.0 |

The insecticidal effects of my new composition against both cotton boll weevils and cotton aphids are illustrated by tests tabulated in Tables III to IX below.

In carrying out the tests, dusts were prepared as described above, and applied to cotton plants growing in the fields. The dusts were applied by means of the standard "hand duster" provided with a hopper and crank for ejecting the dust under pressure through a spout or nozzle onto the plant. In the tests the dusts were applied to infested plants in the field at the rate of from 7 to 10 pounds per acre or as indicated in the particular table. Cages were placed over the field infested plants after dusting. The criterion of the effectiveness of the test at the end of the test period was variously measured as percent kill, increase in number of bolls, percent of living insects per square inch of leaf area, or other measure as indicated in the tables.

Table III illustrates the effectiveness of my new composition at low levels of BHC concentration against cotton aphids in comparison with analogous compositions using standard calcium arsenate and the standard calcium arsenate-nicotine mixture. The percent aphis kill is recorded at an interval of 72 hours after dusting.

TABLE III

| | Per cent aphis kill |
|---|---|
| 90% Standard calcium arsenate + .5% gamma BHC[1] | 9 |
| 90% Special calcium arsenate + .5% gamma BHC[1] | 24 |
| 80% Standard calcium arsenate + 1.0% gamma BHC[2] | 19 |
| 80% Special calcium arsenate + 1.0% gamma BHC[2] | 56 |
| 98% Standard calcium arsenate + 2% nicotine | 74 |

[1] 10% of the 10% gamma BHC-clay mixture described above.
[2] 20% of the BHC-clay mixture described above.

Table IV below likewise illustrates comparative tests against aphids, and shows that my new composition is more effective in aphid control than gamma benzene hexachloride alone, and is even of considerably greater effect than the additive results of standard calcium arsenate plus gamma benzene hexachloride. The compositions were prepared and applied in the manner described for the tests illustrated in Table III, and the percent kill of aphis was recorded 72 hours after dusting.

TABLE IV

| | Per cent kill of cotton aphis |
|---|---|
| .5% gamma BHC[1] + Standard calcium arsenate 90% | 15 |
| .5% gamma BHC[1] + Special calcium arsenate 90% | 30 |
| 1.0% gamma BHC[2] + Standard calcium arsenate 80% | 24 |
| 1.0% gamma BHC[2] + Special calcium arsenate 80% | 59 |
| 1.0% gamma BHC mixture [2] + 80% clay | 41 |

[1] 10% of the BHC-clay mixture described above.
[2] 20% of the BHC-clay mixture described above.

Table V below illustrates the general beneficial effect of dusting cotton plants with my new composition in comparison with commercial calcium arsenate alone and of the gamma benzene hexachloride in an inert clay carrier. The results are measured in terms of percentage increase in the number of cotton bolls, buttons, and flowers on the plants dusted with the gamma benzene hexachloride alone and dusted with my new composition containing the gamma isomer and the special low hydroxyl ion concentration calcium arsenate. The number of bolls, buttons, and flowers on plants treated with commercial calcium arsenate was taken as a standard, with percent increase arbitrarily fixed as zero, and the percentages shown are the percentages based on this standard taken at harvest time approximately two months after dusting. These tests show that over 100% increase in the fruiting potential of plants may be expected by the use of the new composition of my invention.

TABLE V

Treated with—

| | Per cent increase in number of bolls, buttons, flowers |
|---|---|
| Standard calcium arsenate | 0.0 |
| 2% gamma BHC[1] + clay 60% | 70.5 |
| 2% gamma BHC[1] + Special calcium arsenate 60% | 106.0 |

[1] 40% of the 50-50 BHC-clay mixture described above.

In Table VI below are given comparative results of tests on leaf worm with my composition compared to dichlorodiphenyltrichloroethane and compared to gamma benzene hexachloride alone, as indicated by the percent leaf worm population per plant 20 days after dusting.

TABLE VI

|  | Average Leaf Worm Population per Plant | |
|---|---|---|
|  | Test A | Test B |
| 5% DDT [1] +95% inert dust | 23.6 | 18.8 |
| 2% gamma BHC [2] +60% inert dust | 26.2 | 7.2 |
| 2% gamma BHC [2] +60% Special Calcium Arsenate | 9.7 | 5.6 |

[1] Dichlorodiphenyltrichloroethane.
[2] 40% of the BHC clay-mixture described above.

The results recorded below in Table VII illustrate the effectiveness of my new composition dusted at the rate of 8 lbs. per acre, in combating the boll weevil and indicate not only that final control attributable to the new composition is equal to or slightly better than that with standard calcium arsenate, but that my new composition is markedly more effective in initial quick kill of the boll weevil than compositions containing standard calcium arsenate, demonstrating that the new composition is not only effective against aphids, but is even more effective against boll weevil than heretofore used materials.

TABLE VII

| Treated With | Rate of Mortality of Boll Weevil at Indicated Days After Dusting | | |
|---|---|---|---|
|  | 1 day | 2 days | 3 days |
| Special Calcium Arsenate 80% +1% gamma BHC [1] | 72.2 | 94.1 | 100 |
| Standard Calcium Arsenate 80% +1% gamma BHC [1] | 49.7 | 94.1 | 98.2 |
| Standard Calcium Arsenate | 49.7 | 92.7 | 99 |

[1] 20% of the BHC mixture described above.

In Table VIII below results are given of field tests carried out using an insecticidal dust composition of my invention comprising 80% of special calcium arsenate and 20% of a benzene hexachloride containing 10% of the gamma isomer, so that the dust composition contained about 2% of the gamma isomer, in comparison with standard calcium arsenate. The dusts were applied to cotton plants in Louisiana fields by a standard dusting procedure during intervals in the growing season as indicated and at the dosages per acre and with the results indicated in the table.

In Table IX below, results are given of a series of field tests on cotton plants carried out in Mississippi showing control of boll weevil and aphis by the use of my composition containing 1% and 2% respectively of gamma BHC combined with special calcium arsenate in comparison with standard calcium arsenate and with a composition containing 3% of BHC in an inert dust carrier. The results were recorded after a total of nine applications at 7 pounds per acre, made at about five-day intervals.

TABLE IX

| Composition Applied | Aphis per Square Inch | Boll Weevil Per Cent Infested Squares |
|---|---|---|
| Standard Calcium Arsenate 100% | .88 | 27 |
| Special Ca. Ars. 90%+1% gamma | .40 | 19 |
| Special Ca. Ars. 80%+2% gamma | .16 | 15 |
| Special Ca. Ars. 60%+2% gamma | .10 | 18 |
| BHC+inert dust 3% gamma | .05 | 21 |

The above tests, illustrated in Table IX, show that by the use of my new composition, substantially much smaller quantities of calcium arsenate can be used to effect the same degree of boll weevil control than were necessary when using the standard type of calcium arsenate, and at the same time, excellent control of aphids may be obtained. This result is effectively illustrated by the test in Table IX wherein only 60% of special calcium arsenate effected even better boll weevil control than 100% of standard calcium arsenate, showing 18% infestation for 60% special calcium arsenate against 27% infestation for 100% calcium arsenate while reducing the aphis per square inch from .88 when standard calcium arsenate was used to .10 when 60% calcium arsenate was used with 2% gamma benzene hexachloride. I have found that adequate boll weevil control may be obtained by my composition when it contains as little as 50% of special calcium arsenate.

While the above describes the preferred embodiments of my invention it will be understood that departures may be made therefrom within the scope of the specification and claims.

I claim:

1. An insecticidal composition adapted for simultaneously combating insect pests of the character of *Anthonomus grandis* Boh. and *Aphis gossypii* Glov., comprising a quantity between about .5 and about 5% of gamma benzene hexachloride, and a major proportion of a substan-

TABLE VIII

| Date | Standard Calcium Arsenate | | | Mixture of Special Cal. Ars.+BHC (2% gamma) | | |
|---|---|---|---|---|---|---|
|  | 8–10 lb. per acre Date Applied | Percent Squares Punctured by Boll Weevils | Average Aphids per Sq. Inch | 8–10 lb. per acre Date Applied | Percent Squares Punctured by Boll Weevils | Average Aphids per Sq. Inch |
| July 16 |  |  |  |  |  |  |
| July 22 | X | 27 |  |  | 15 |  |
| July 27 |  | 33 |  |  | 30 |  |
| July 28 | X |  |  | X |  |  |
| July 29 |  |  |  |  |  |  |
| Aug. 2 | X | 35 |  | X | 12 |  |
| Aug. 5 |  |  |  |  |  |  |
| Aug. 12 |  | 3 |  |  | 0 |  |
| Aug. 19 |  | 12 | 6.58 |  | 5 | 2.11 |
|  |  |  | 13.89 |  |  | 3.09 | tially lime-free calcium arsenate having a hydroxyl ion concentration when slurried in water equivalent to a pH of between 9.3 and 10.5.

2. An insecticidal composition adapted for simultaneously combating insect pests of the character of *Anthonomus grandis* Boh. and *Aphis gossypii* Glov., comprising a quantity between about .5 and about 5% of gamma benzene hexachloride, and a major proportion of a substantially lime-free calcium arsenate having a hydroxyl ion concentration when slurried in water equivalent to a pH of between 9.3 and 10.5, and an arsenic content of at least about 45% calculated as $As_2O_5$.

3. An insecticidal composition adapted for simultaneously combating insect pests of the character of *Anthonomus grandis* Boh. and *Aphis gossypii* Glov., comprising from 0.5 to 5% gamma benzene hexachloride, and from 50-90% of a substantially lime-free calcium arsenate having a hydroxyl ion concentration when slurried in water equivalent to a pH of between 9.3 and 10.5.

4. An insecticidal composition adapted for simultaneously combating insect pests of the character of *Anthonomus grandis* Boh. and *Aphis gossypii* Glov., comprising at least about 2% gamma benzene hexachloride, and at least about 50% of a substantially lime-free calcium arsenate having a hydroxyl ion concentration when slurried in water equivalent to a pH of between 9.3 and 10.5, said composition containing not more than about 1% water-soluble arsenic content as determined by the "Geneva" method.

5. A stable insecticidal composition comprising in dust form a uniform mixture of a quantity between about .5 and about 5% of gamma benzene hexachloride and a major proportion of calcium arsenate having a pH between about 9.3 and 10.5 and possessing stability characteristics on storage such that the increase in water-soluble arsenic content upon storage for two months is not more than about .2%.

6. A method for simultaneously combating insect pests on cotton of the character of *Anthonomus grandis* Boh. and *Aphis gossypii* Glov., which comprises applying to infested cotton plants a composition comprising a quantity between about .5 and about 5% of gamma benzene hexachloride and a major proportion of a substantially lime-free calcium arsenate having a pH of between about 9.3 and 10.5 when slurried in water.

THOMAS W. COLLINS, JR.

REFERENCES CITED

The following references are of record in the file of this patent:

UNITED STATES PATENTS

| Number | Name | Date |
| --- | --- | --- |
| 1,649,562 | Blyth | Nov. 15, 1927 |
| 1,728,662 | Chwala | Sept. 17, 1929 |

OTHER REFERENCES

Ewing et al., J. Econ. Ent., vol. 40, No. 3, June 1947, pp. 374–381.

Rainwater et al., J. Econ. Ent., vol. 40, No. 3, pp. 371–373, June 1947.

Ivy et al., J. Econ. Ent., vol. 39, pp. 38–41 (1946).

Gaines et al., J. Econ. Ent., vol. 40, pp. 365–70 (1947).

Slade, Chemistry and Industry, October 13, 1945, pp. 314–319.